United States Patent
Gu et al.

(10) Patent No.: US 6,398,778 B1
(45) Date of Patent: Jun. 4, 2002

(54) OPTICAL FIBER DIFFUSER

(75) Inventors: Xijia Gu, Toronto; Robin Chi-Hung Tam, Thornhill, both of (CA)

(73) Assignee: Photonics Research Ontario, Toronto (CA)

( * ) Notice: Subject to any disclaimer, the term of this patent is extended or adjusted under 35 U.S.C. 154(b) by 0 days.

(21) Appl. No.: 09/335,744

(22) Filed: Jun. 18, 1999

(51) Int. Cl.[7] .............................................. A61B 18/18
(52) U.S. Cl. ............................ 606/15; 606/17; 607/89; 356/72; 385/12; 385/147; 65/392
(58) Field of Search ........................... 606/2, 3, 10–18; 607/88, 89, 100, 102; 356/72, 73; 385/12, 147; 65/376, 385, 392

(56) References Cited

U.S. PATENT DOCUMENTS

| | | | |
|---|---|---|---|
| 4,336,809 A | * 6/1982 | Clark | .......................... 606/10 |
| 4,422,719 A | 12/1983 | Orcutt | |
| 4,733,929 A | 3/1988 | Brown | |
| 4,986,628 A | 1/1991 | Lozbeako et al. | |
| 5,196,005 A | 3/1993 | Doiron et al. | |
| 5,207,669 A | 5/1993 | Baker et al. | |
| 5,269,777 A | 12/1993 | Doiron et al. | |
| 5,330,465 A | 7/1994 | Doiron et al. | |
| 5,643,253 A | 7/1997 | Baxter et al. | |
| 5,719,975 A | * 2/1998 | Wolfson et al. | ............... 385/48 |

FOREIGN PATENT DOCUMENTS

| | | |
|---|---|---|
| EP | 0273311 | 6/1988 |
| EP | 0438759 | 7/1991 |
| EP | 0840150 | 5/1998 |
| EP | 0874191 | 10/1998 |
| WO | 9923041 | 5/1999 |

* cited by examiner

*Primary Examiner*—David M. Shay
(74) *Attorney, Agent, or Firm*—Lynn C. Schumacher; Hill & Schumacher

(57) ABSTRACT

Optical fiber diffusers for emitting light cylindrically along a length of the fiber diffuser with preselected light intensity distributions along the length of the diffuser. The diffuser portion is defined by forming a Bragg grating in a section of the optical fiber core having a modulated index of refraction which acts to couple light radially out of the fiber along the diffuser section. The intensity distribution of light coupled out of the diffuser section of the fiber is controlled by controlling the profile of the modulated index of refraction, namely the coupling coefficient, along the length of the grating. For photodynamic therapy type II strong Bragg gratings are preferred which give higher intensity output over short distances. Multiple Bragg gratings can be written into a multimode fiber for emission of light at several positions along the fiber. Writing a Bragg grating into a multimode fiber provides a method of monitoring transmission in the fiber since some of the light can be coupled out and detected and interrogated. The diffuser device can be used as sensors since they also couple light incident on the diffuser into the core where it is transmitted to a detector.

21 Claims, 5 Drawing Sheets

OPTICAL FIBER DIFFUSER

FIELD OF THE INVENTION

The present invention relates to optical fiber diffuser devices for emitting light along a length of the fiber diffuser, and more particularly the invention relates to optical fiber diffusers and methods of producing them with preselected light intensity distribution along the length of the diffuser.

BACKGROUND OF THE INVENTION

The use of optical fiber as a waveguide to deliver light from a light source to a remote location has long been considered desirable. A number of medical applications, such as photodynamic therapy, interstitial laser photocoagulation or interstitial laser hyperthermia for tumor destruction, require a diffuser that emits laser light radially from the optical fiber. One of the main challenges of making such a device is to have the light emitted homogeneously along the length of the diffuser tip, especially for tips longer than 5.0 mm. In some applications the fiber diffuser needs to be thin enough to go through hollow-bore needles and endoscopes.

Present cylindrical fiber diffusers use micro-beads or Rayleigh scatters distributed along the fiber tip to scatter the light radially. The amount of light scattered can be controlled by the size and density of microbeads. The diffuser outer diameter range from 0.356 to 1.4 mm (typically 1 mm). U.S. Pat. Nos. 5,196,005 and 5,330,465 issued to Doiron et al. disclose such a diffuser tip having scattering centers embedded in a silicon core that abuts the end of an optical fiber. The scattering centers are embedded in the silicon core in such a way that they increase in density from the proximal end of the diffuser abutting the optical fiber to the distal end of the diffuser. U.S. Pat. No. 5,269,777 issued to Doiron et al. discloses a diffuser tip having a silicon core attachable to the end of an optical fiber. The cylindrical silicone core is coated with an outer silicon layer having scattering centers embedded therein.

U.S. Pat. No. 6,643,253 issued to Beer et al. is directed to an optical fiber diffuser including an attachment that abuts the end of an optical fiber. The diffuser includes a polymeric core in which scattering centers are embedded.

U.S. Pat. No. 4,986,628 issued to Lozbenko et al. teaches an optical fiber diffuser attachment that abuts the end of an optical fiber. The diffuser is made of an optically turbid medium which may be polymer based which is contained in a protective envelope or sheath that slides over the end of the optical fiber.

U.S. Pat. No. 5,207,669 issued to Baker et al. discloses an optical fiber diffuser tip that abuts the end of an optical fiber for providing uniform illumination along the length of the diffuser tip. The diffuser section is produced by thinning the higher refractive index cladding surrounding the multimode fiber core so it has a thickness less than the penetration depth of the evanescent field to permit penetration of the cladding by the evanescent fields along the diffuser section. Some of the light propagating down the fiber core will therefore be emitted and some reflected back into the core at each point along the diffuser tip.

Single mode fibers with weak tilted phase gratings couple light out of the fiber have been disclosed in T. Erdogan and J. E. Sipe, Tilted Fiber Phase Gratings, J. Opt. Soc. Am. A/Vol. 13, No. 2/February 1996.

There are several inherent disadvantages of these types of diffusers including difficulty in achieving illumination homogeneity for long diffusers, and that typically they are non-Lambertian emitters, many are restricted to use at the ends of the optical fiber, and the diffuser tips can break loose at high light intensity as have been observed and they are relatively expensive in that separate diffuser tips have to be produced and adjoined to the end of the optical fiber.

Therefore, there is a need for optical diffusers that approximate Lambertian emission, are not limited to the ends of the fiber and do not require the assembly of separate component parts.

SUMMARY OF THE INVENTION

It is an object of the present invention to provide an optical fiber diffuser device that can be produced in any portion of an multimode optical fiber. It is also an objective of the present invention to provide an optical fiber diffuser device that is integrally formed with an optical fiber.

An advantage of the optical fiber diffuser devices constructed in accordance with the present invention is that they can be produced with variable intensity distributions along the length of the diffuser as required for the particular application for which the diffuser is designed. Another advantage of the diffusers is they are not attached to the end of the fiber as a separate piece but are formed anywhere along the optical fiber as part of the fiber itself.

The present invention provides an optical fiber diffuser device. The optical fiber diffuser device comprises a multimode optical fiber having a core and a cladding surrounding the core and including at least one Bragg grating in an preselected length of the core defining a diffuser portion. The at least one Bragg grating includes an effective modulated index of refraction along a length of the diffuser portion for coupling optical radiation radially outwards from the diffuser portion with a preselected intensity distribution as a function of distance along the length of the diffuser portion.

In this aspect of the invention the Bragg grating may be a type II strong Bragg grating. The diffuser emits light with a substantially Lambertian intensity distribution.

The present invention also provides a method of producing an optical fiber diffuser device, comprising providing a multimode optical fiber having a core and a cladding surrounding the core; calculating a coupling coefficient based on a preselected intensity distribution of optical radiation to be radially emitted along a preselected length of the multimode optical fiber and producing at least one Bragg grating in the core of the multimode optical fiber along the preselected length. The at least one Bragg grating has an effective length and including an effective modulated index of refraction along the preselected length of the diffuser portion corresponding to the coupling coefficient for coupling optical radiation radially outwards from the diffuser portion with a preselected intensity distribution as a function of distance along the length of the diffuser portion.

In another aspect of the invention there is provided a device for photothermal treatment of tumors. The device comprises a fiber diffuser including a multimode optical fiber having a core and a cladding surrounding the core. The device includes at least one type II Bragg grating in a preselected length of the core defining a diffuser portion. The at least one type II Bragg grating includes an effective modulated index of refraction along the length of the diffuser portion for coupling light radially outwards from the diffuser portion with a preselected intensity distribution as a function of distance along the length of the diffuser portion. The device includes a light source connected to one end of the multimode optical fiber.

In this aspect of the invention the diffuser portion emits light with a substantially Lambertian intensity distribution.

In another aspect of the invention there is provided a method of monitoring light signals transmitted along a multimode optical fiber. The method comprises forming a Bragg grating in a preselected length of a multimode optical fiber, the Bragg grating having an effective grating strength to couple some of the light transmitted along the multimode fiber out of the multimode fiber. The Bragg grating has an effective modulated index of refraction along the preselected length to give a desired intensity distribution of light emitted radially from the multimode fiber along said preselected length. The method includes detecting light emitted radially from the preselected length of the multimode fiber containing the Bragg grating.

The present invention also provides an optical sensor comprising a light detection means and an optical fiber connected to the light detection means. The optical fiber includes a multimode optical fiber having a core and a cladding surrounding the core and including at least one type II Bragg grating in a preselected length of the core defining a diffuser portion. The at least one type II Bragg grating includes an effective modulated index of refraction along the preselected length of the diffuser portion for coupling a fraction of light incident on the diffuser portion into the core which is transmitted to the light detection means.

BRIEF DESCRIPTION OF THE DRAWINGS

The invention will now be described, by way of non-limiting examples only, reference being had to the accompanying drawings, in which:

FIG. 3b shows a constant intensity distribution along a length of a fiber diffuser for the diffuser of FIG. 3a;

DETAILED DESCRIPTION OF THE INVENTION

The present invention provides a method of producing fiber diffusers directly in multimode optical fibers thereby avoiding the deficiencies associated with separate fiber diffusers that are attached on the end of an optical fiber. The method of producing the fiber diffusers is based on imprinting Bragg gratings into a portion of the multimode fiber. The so called Bragg grating, normally associated with a single mode optical fiber, is also referred to as short-period grating and comprises a periodic refractive index modulation along a portion of the single mode fiber with a periodicity of the order of 0.5 $\mu$m. The Bragg grating couples the forward guided mode into a backward guided mode and is therefore commonly referred to as a reflective filter. The refractive index modulation is typically produced by the uniform UV laser beam irradiating an optical fiber through an amplitude mask or a phase mask, or is produced by imprinting on the fiber an interference pattern generated by two-beam interference with a UV laser, to give a modulated index of refraction n+$\Delta$n in which n is the refractive index of the core and $\Delta$n is the change of the index caused by the UV laser irradiation on a photosensitive single mode optical fiber.

Figure 1:
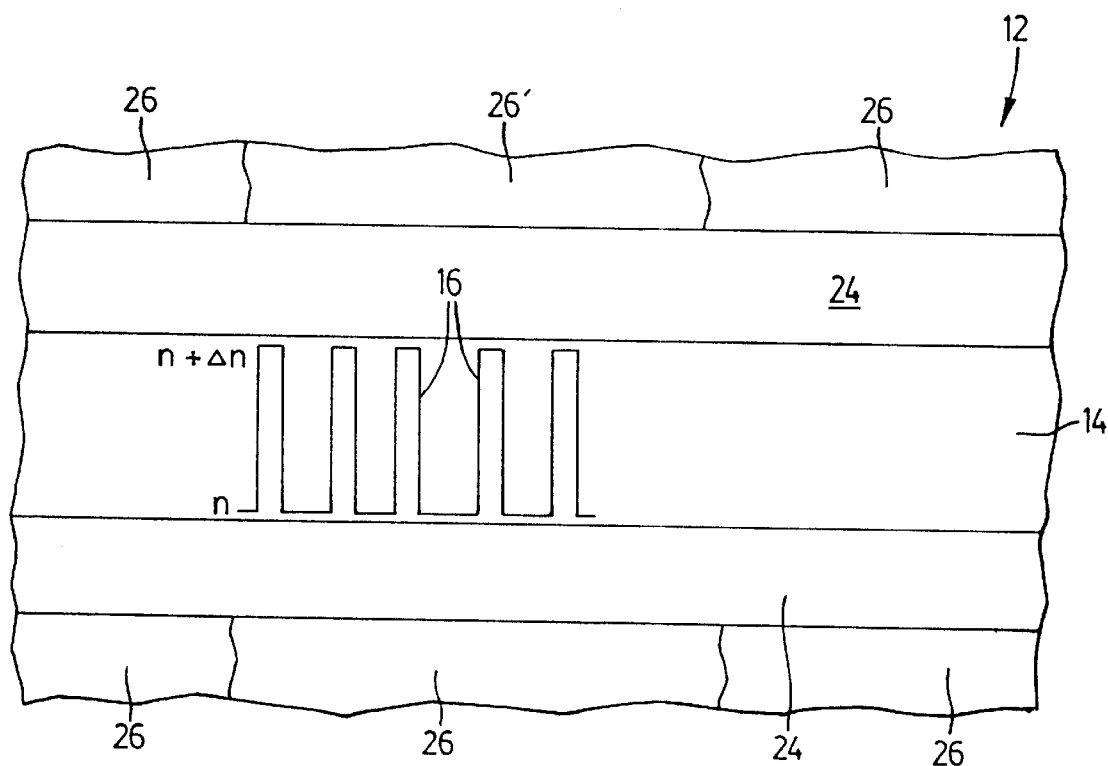
FIG. 1 illustrates a multimode fiber with a grating formed in accordance with the present invention.

Referring to FIG. 1, the method of the present invention involves producing strong Bragg gratings 16 in a multimode optical fiber 12. The optical fiber 12 includes a fiber core 14 surrounded by a cladding 24 and a protective buffer layer 26. The gratings are produced in much the same way as writing gratings in single mode fibers, where the grating periods, i.e. the refractive index modulations, are generated across the whole cross-section of the fiber core 14, except that the Bragg gratings in the present multimode fiber case are preferably created with much stronger refractive index modulations, preferably type II gratings as discussed hereinafter. Light is coupled out by these strong gratings at the fiber core and cladding interface radially out of the diffuser portion.

Figure 2:
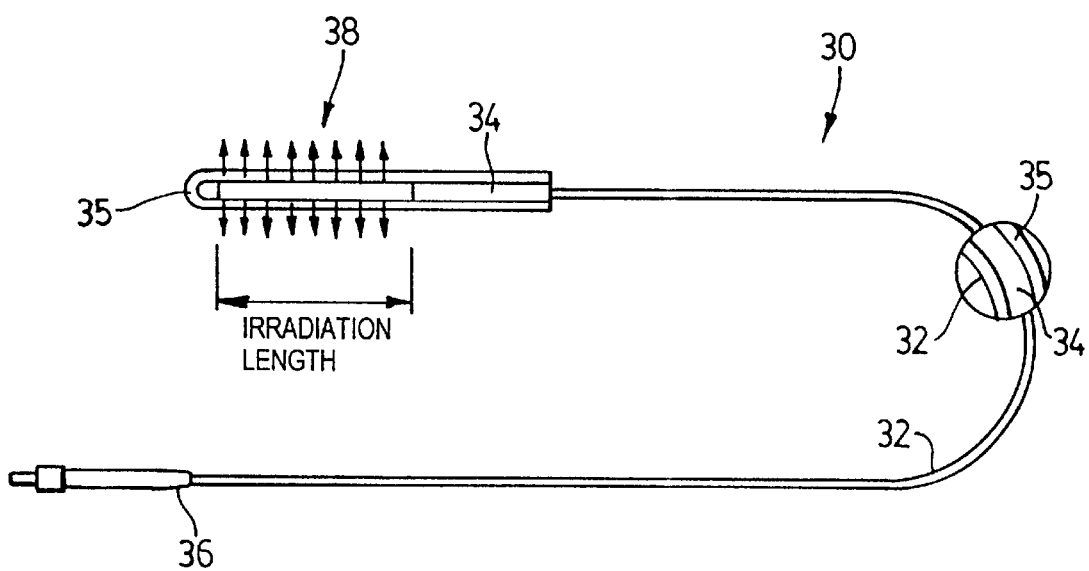
FIG. 2 shows an optical fiber with a fiber diffuser at one end thereof to emit light with a uniform intensity distribution along the length of the diffuser.

An optical fiber diffuser device constructed in accordance with the present invention is shown generally at 30 in FIG. 2. The device includes a multimode optical fiber 32 having a fiber core 34 and cladding 35 (see the enlarged detailed section) and a screw mount assembly (SMA) connector 36 (or other standard connector) at one end of the fiber. The other end portion of the fiber comprises a cylindrical diffuser portion 38 of desired length L formed in the fiber core 34. Referring again to FIG. 2, the diffuser 38 is produced by imprinting a grating in the fiber core 34 along the multimode optical fiber 32. The guided light is coupled into the cladding 35 and then out of the fiber 32.

As discussed above, the fiber Bragg grating comprises a periodic change in refractive index along the core of the fiber. At each period, a portion of the guided optical wave is reflected, interfering with other reflected components from the other periods in a constructive manner, see for example Meltz, G., Morey, W. W., Glen, W. H., "Formation of Bragg Gratings In Optical Fibers By Transverse Holographic Method", Opt. Lett. 14(15) 813 (1989).

The technique used to imprint such a grating requires that the fiber be transversely exposed to a high power UV light. When the UV light passes through a phase mask put in front of the fiber, an interference pattern is produced, creating a structural change in the fiber core, which results in a permanent and stable modification of its refractive index.

There are two types of fiber gratings made with different level of UV light energies. Type I grating is based on the UV color center photosensitivity process. Type II grating is based on the process of a UV-induced damage in the core-cladding interface area. In type II gratings, coupling between the fundamental mode and cladding modes can result in the light being coupled out from the fiber core into free space. Type I Bragg gratings are considered to be weaker gratings in the sense there is less of an abrupt refractive index change at the cladding/core interface. Conversely, type II gratings are much stronger gratings characterized by a much more abrupt change in refractive index at the cladding/core interface. These stronger Bragg gratings ensure significant intensity of light is coupled or emitted out of the fiber. The inventors have noted that type I gratings in multimode fibers also couple light out of the fiber but this configuration is characterized by much lower intensities but may be useful for emitting light over very long lengths of the fiber. For medical PDT applications the much stronger type II gratings formed in the multimode fibers are preferred to give significantly higher emitted light intensities over shorter distances (typically up to several cm).

The amount of light being coupled out is dependent on the strength of the grating. If the strength of the grating is kept constant, the light intensity coupled out along the grating will follow the Beer-Lambert Law:

$$I=I_0[1-\exp(-KL)] \qquad \text{(eq. 1)}$$

where I is the light intensity coupled out from the side of the fiber core, $I_0$ is the light intensity in the fiber core before the grating, K is the coupling coefficient and is proportional to the refractive index change ($\Delta n$) due to laser irradiation, and L is the length of the grating.

Figure 3A:
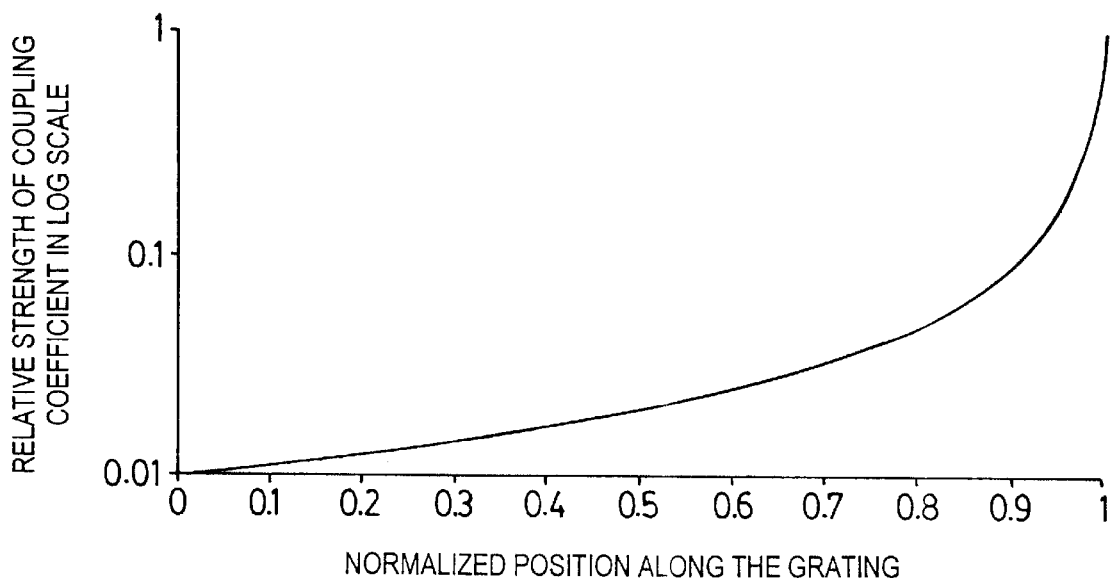
FIG. 3a is a plot of coupling coefficient as a function of position along a diffuser for emitting a uniform intensity along the diffuser.
Figure 3B:
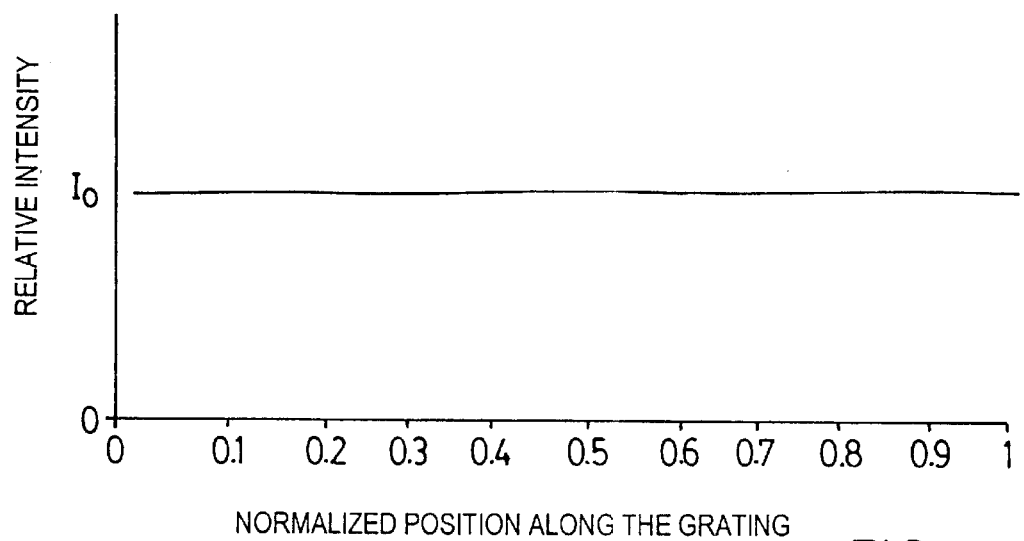

The intensity distribution of light coupled out of the diffuser section of the fiber can be controlled by controlling the coupling coefficient along the grating. For example, a grating that couples light uniformly out of the fiber core along the length of the diffuser as shown in FIG. 2 can be produced using a diffuser with a coupling coefficient K as shown in FIG. 3a with FIG. 3b showing the corresponding intensity distribution as a function of normalized position along the diffuser. Specifically, since the coupling coefficient increases with the fluence of the UV laser used to imprint the fiber gratings, by either increasing the energy or the repetition rate of the laser pulses, the coupling coefficient can be increased along the fiber as shown in FIG. 3a (which shows a smoothed or idealized refractive index profile). Thus, using the method of the present invention it is possible to custom design the coupling coefficient K as a function of location along the grating, and hence modulate the light output along the diffuser in any preselected profile.

Using the configuration of FIG. 2 as an example, a medical laser, normally in red or infrared, is launched into optical fiber 32 through a fiber connector 36. The laser light is guided through the lead fiber 32 with a negligible loss and coupled out through diffuser 38 with the diffuser acting as a Lambertian emitter of optical radiation (typically 187 nm to about 10 microns wavelength). The end of the diffuser 38 may be terminated by an end coated silver mirror, or terminated by a cleaved end.

Figure 4:
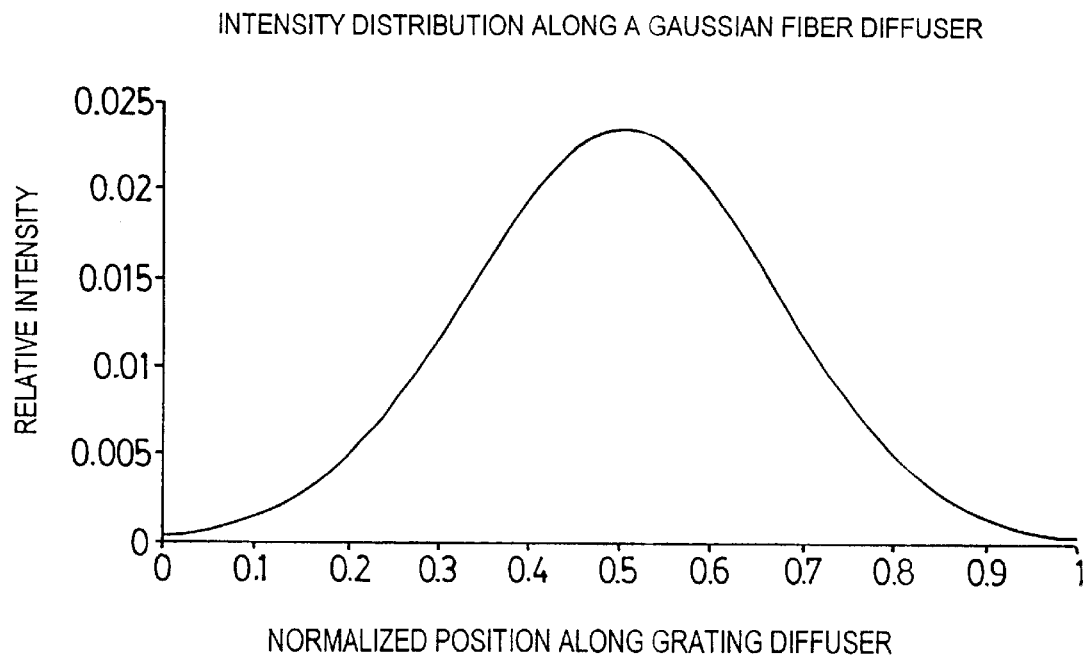
FIG. 4 shows a Gaussian intensity distribution along a length of a fiber diffuser.
Figure 5:
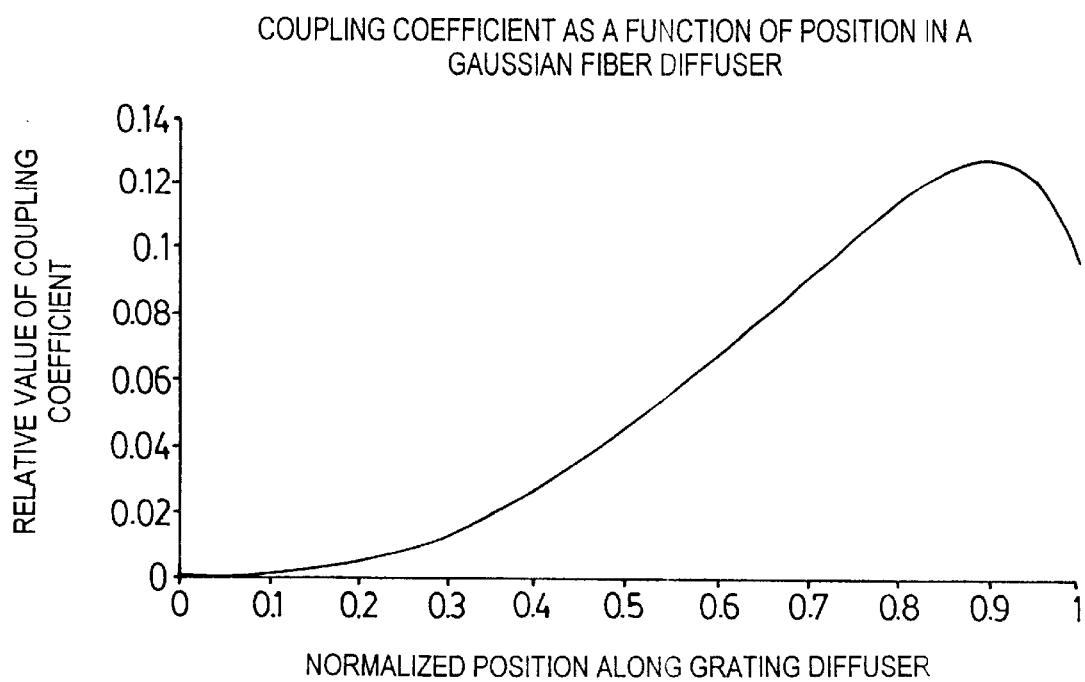
FIG. 5 is a plot of coupling coefficient as a function of position along a diffuser for emitting an intensity profile having a Gaussian distribution along the diffuser as shown in FIG. 4.

In some medical applications it may be desirable to have a strong light dose that illuminates the center of a tissue volume and a reduced light dosage towards the edge similar to a Gaussian intensity distribution shown in FIG. 4, This can be achieved using a diffuser designed with a coupling coefficient as shown in FIG. 5.

There are several important advantages obtained with the diffusers constructed according to the present invention. Very long diffusers can be made with a uniform distribution of light emitted radially along the length of the diffuser. Diffusers having specially tailored light distribution patterns along the length of the diffuser can be designed since the amount of light coupled out of the fiber is determined by the strength of the refractive index modulation. Regardless of the intensity of light radially emitted along the length of the diffuser portion, the present diffusers approximate Lambertian emitters. This is a significant improvement over diffusers that use embedded scattering centers which are not Lambertian emitters but rather are characterized by a cone of light emitted In the direction of propagation down the fiber with the fiber acting as a cylindrical axis. This directionality of the emitted light in these diffusers is problematic in for example PDT applications in respect of position the diffusers to irradiate the desired region of tissue.

Also, with the present emitters, light can be emitted over very long multimode fiber lengths (meters) albeit with very low light intensities using type I weak Bragg gratings while on the other hand with type II strong Bragg gratings much higher intensities are achieved over shorter distances. The present optical fiber diffusers disclosed herein have been be produced having a length preferably in a range from about 1 mm to about 100 mm although longer gratings can certainly be made.

The present fiber diffusers can be constructed with a diameter small enough to allow them to be fitted into endoscopes or thin hollow-bore needles (for example fiber diffusers can be produced with an outer diameter as small as 125 $\mu$m) for insertion into tissue/tumors. The fiber diffusers are capable of handling relatively high optical power since no absorbing materials are required in construction of the diffusers. The present diffusers are just as flexible as normal communication fiber when the fiber grating portion is re-coated with a buffer layer 26' as shown in FIG. 1.

Figure 6:
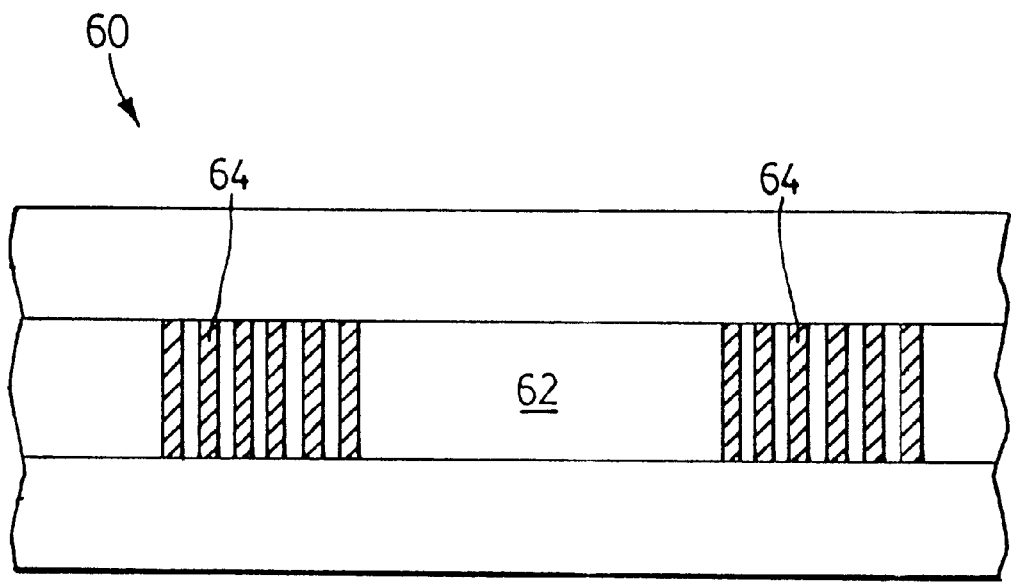
FIG. 6 shows an alternative embodiment of a fiber diffuser constructed according to the present invention.
Figure 7:
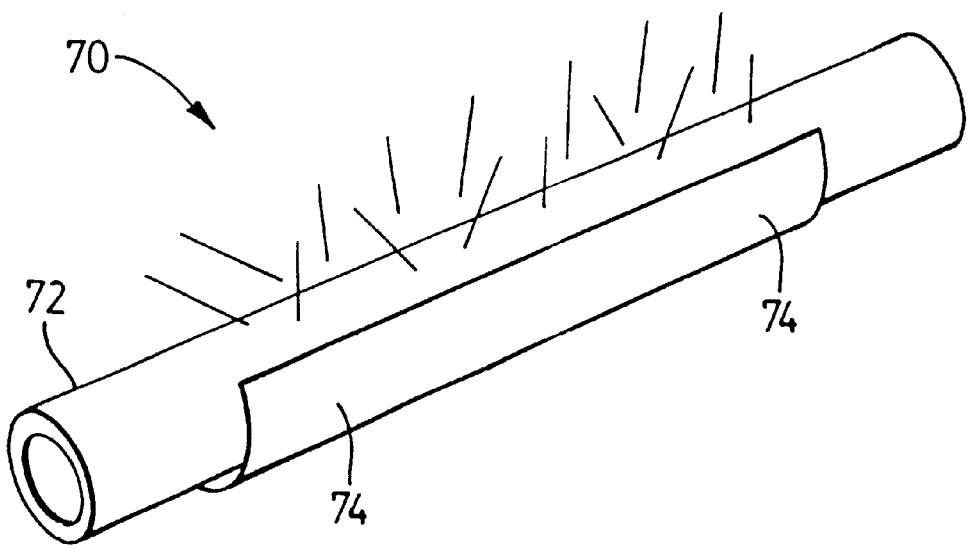
FIG. 7 shows another alternative embodiment of a fiber diffuser.

In addition, multiple spaced isotropic diffusers may be written into any section of the fiber spaced from the end portion of the fiber. FIG. 6 shows an embodiment of a fiber diffuser at 60 constructed in accordance with the present invention comprising a multimode fiber 62 having several diffuser sections 64 spaced along the fiber. FIG. 7 shows another fiber diffuser at 70 wherein a portion of the cylindrical fiber 72 has been coated with a mirror 74 to reflect light that would be emitted from that portion of the fiber out of the uncoated portion.

It will be understood by those skilled in the art that the present method of producing optical diffusers by use of gratings formed within the multimode fiber may also be used to provide a means of accessing the contents of the fiber. Writing a grating in a section of an optical fiber allows one to couple out at that point in the fiber some of the light signal propagating in the fiber. Thus the present invention provides a method of monitoring or testing, at any position in the fiber by creating a very short section of diffuser at that position. The emitted light signals would be detected using a detector and the signals interpreted using a signal processor.

It will also be understood by those skilled in the art that the optical diffusers disclosed herein may be used to produce sensors for detecting light incident on the fiber at any position along the diffuser portion of the fiber. The process of coupling a light signal back into the fiber is not highly efficient but nevertheless some of the light incident on the diffuser will be captured and will propagate down the fiber to be interrogated by a detector. A sensor based on this type of configuration is very advantageous in for example hostile environments not amenable to expensive detectors.

The foregoing description of the preferred embodiments of the invention has been presented to illustrate the principles of the invention and not to limit the invention to the particular embodiments illustrated. It is intended that the scope of the invention be defined by all of the embodiments encompassed within the following claims and their equivalents.

Therefore what is claimed is:

1. An optical fiber diffuser device, comprising:
 a multimode optical fiber having a core and a cladding surrounding said core and including at least one Bragg grating in an preselected length of the core defining a diffuser portion, the at least one Bragg grating including an effective modulated index of refraction along a length of the diffuser portion for coupling optical radiation radially outwards from said diffuser portion with a preselected intensity distribution as a function of distance along the length of the diffuser portion.

2. The optical fiber diffuser device according to claim 1 wherein said Bragg granting is a type II strong Bragg grating.

3. The optical fiber diffuser device according to claim 2 wherein the index of refraction profile is modulated to produce a substantially uniform intensity output along the length of the diffuser portion.

4. The optical fiber diffuser device according to claim 2 wherein the index of refraction profile is modulated to produce a substantially Gaussian intensity output along the length of the diffuser portion.

5. The optical fiber diffuser device according to claim 2 wherein the at least one diffuser portion is a plurality of diffuser portions spaced along the optical fiber.

6. The optical fiber diffuser device according to claim 2 wherein a portion of the cladding surrounding said diffuser portion is coated with a mirror.

7. The optical fiber diffuser device according to claim 2 wherein the diffuser emits light with a substantially Lambertian intensity distribution.

8. A device for photothermal treatment of tumors, comprising:
a fiber diffuser including a multimode optical fiber having a core and a cladding surrounding said core and including at least one type II Bragg grating in a preselected length of the core defining a diffuser portion, the at least one type II Bragg grating including an effective modulated index of refraction along said length of the diffuser portion for coupling light radially outwards from said diffuser portion with a preselected intensity distribution as a function of distance along the length of the diffuser portion; and
a source of optical radiation connected to one end of the multimode optical fiber 9. The device according to claim 8 wherein the at least one diffuser portion is a plurality of diffuser portions spaced along the optical fiber, each diffuser portion comprised of a type II Bragg grating.

10. The device according to claim 8 wherein the diffuser portion emits light with a substantially Lambertian intensity distribution.

11. The device according to claim 10 wherein the index of refraction profile is modulated to produce a substantially uniform intensity output along the length of the diffuser portion.

12. The device according to claim 10 wherein the index of refraction profile is modulated to produce a substantially Gaussian intensity output along the length of the diffuser portion.

13. The device according to claim 10 including a housing holding at least a portion of the optical fiber, and including adjustment means for extending and retracting the diffuser portion of the optical fiber.

14. The device according to claim 13 wherein the housing is a hollow-bore needle.

15. The device according to claim 13 wherein the housing is an endoscope.

16. A method of producing an optical fiber diffuser device, comprising:
providing a multimode optical fiber having a core and a cladding surrounding said core; and
calculating a coupling coefficient based on a preselected intensity distribution of optical radiation to be radially emitted along a preselected length of the multimode optical fiber and producing at least one Bragg grating in the core of the multimode optical fiber along said preselected length, the at least one Bragg grating having an effective length and including an effective modulated index of refraction along the preselected length of the diffuser portion corresponding to said coupling coefficient for coupling optical radiation radially outwards from said diffuser portion with a preselected intensity distribution as a function of distance along the length of the diffuser portion.

17. The method according to claim 16 wherein said Bragg grating is a type II strong Bragg grating.

18. The method according to claim 17 wherein said coupling coefficient is selected to give a substantially uniform intensity distribution along the length of the diffuser portion.

19. The method according to claim 17 wherein said coupling coefficient is selected to give a Gaussian intensity distribution along the length of the diffuser portion.

20. The method according to claim 17 wherein the step of producing at least one diffuser portion includes producing a plurality of diffuser portions spaced along the optical fiber.

21. The method according to claim 17 including applying a mirror coating to a portion of the cladding surrounding said diffuser portion.

* * * * *

UNITED STATES PATENT AND TRADEMARK OFFICE
CERTIFICATE OF CORRECTION

PATENT NO. : 6,398,778 B1 Page 1 of 1
DATED : June 4, 2002
INVENTOR(S) : Xijia Gu and Robin Chi-Hung Tam It is certified that error appears in the above-identified patent and that said Letters Patent is hereby corrected as shown below:

<u>Column 7,</u>
Line 6, claim 2 should read:
    2. The optical fiber diffuser device according to claim 1 wherein said Bragg grating is a type II strong Bragg grating.

Signed and Sealed this

Twenty-fourth Day of December, 2002

JAMES E. ROGAN
*Director of the United States Patent and Trademark Office*